(No Model.) 2 Sheets—Sheet 1.

R. MORGAN & J. MENZIES.
WATER CLOSET.

No. 477,867. Patented June 28, 1892.

Witnesses
J. H. Shumway
Lillian D. Kelsy

Robert Morgan
and John Menzies
By Atty. Earle & Seymour
Inventors (No Model.) 2 Sheets—Sheet 2.
R. MORGAN & J. MENZIES.
WATER CLOSET.
No. 477,867. Patented June 28, 1892.
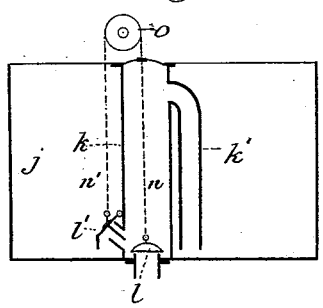
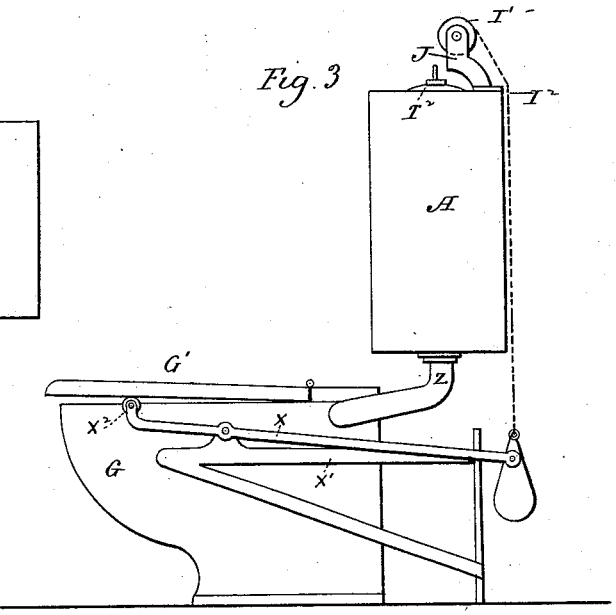
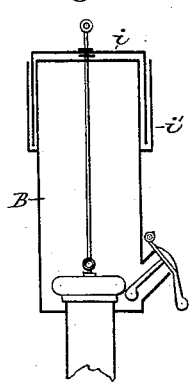
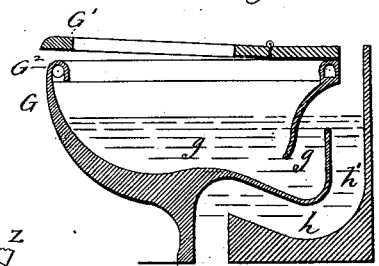
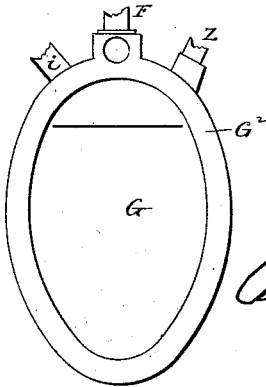

UNITED STATES PATENT OFFICE.

ROBERT MORGAN AND JOHN MENZIES, OF NEW HAVEN, CONNECTICUT.

WATER-CLOSET.

SPECIFICATION forming part of Letters Patent No. 477,867, dated June 28, 1892.

Application filed November 2, 1891. Serial No. 410,570. (No model.)

*To all whom it may concern:*

Be it known that we, ROBERT MORGAN and JOHN MENZIES, of New Haven, in the county of New Haven and State of Connecticut, have invented a new Improvement in Water-Closets; and we do hereby declare the following, when taken in connection with accompanying drawings and the letters of reference marked thereon, to be a full, clear, and exact description of the same, and which said drawings constitute part of this specification, and represent, in—

Figure 1:
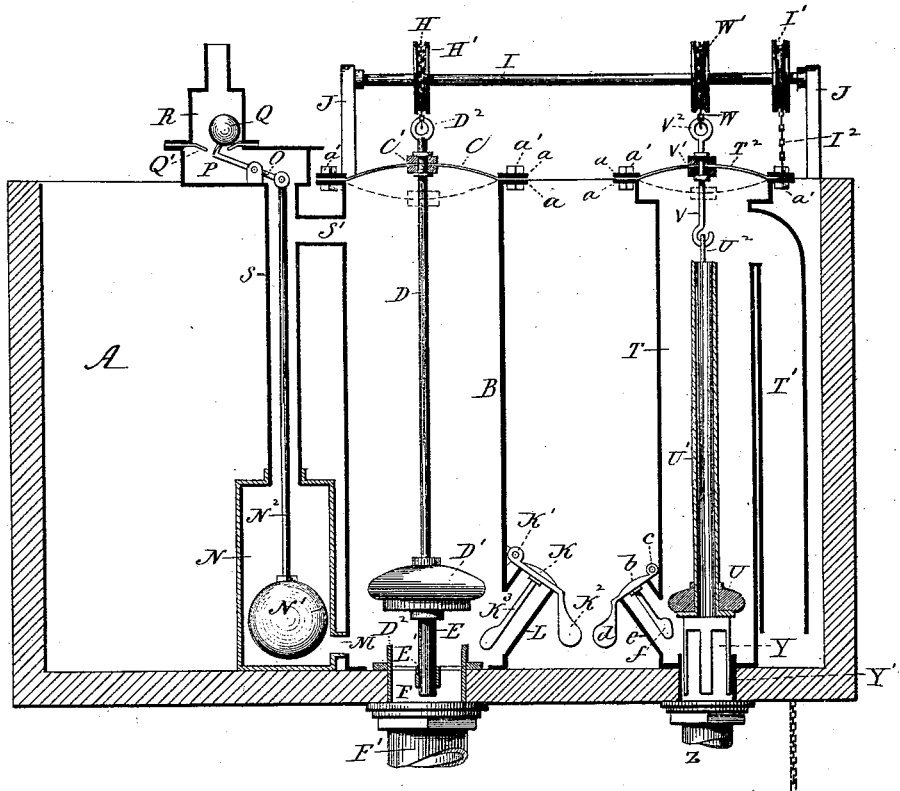
Figure 2:
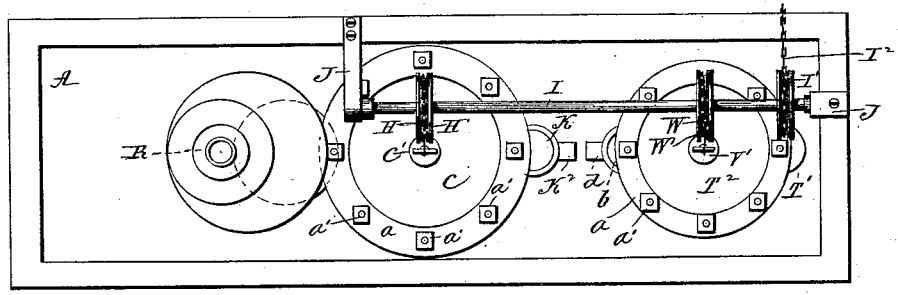

Figure 1, a view partly in elevation and partly in vertical central section through a water-closet tank constructed in accordance with our invention; Fig. 2, a plan view of the said tank; Fig. 3, a view showing the tank in end and the closet in side elevation; Fig. 4, a detached view of the bowl in central longitudinal section; Fig. 5, a detached plan view of the said bowl; Fig. 6, a detached sectional view showing a modified construction for the exhaust-chamber in the tank; Fig. 7, a view of a simplified form which a tank constructed in accordance with our invention may assume.

Our invention relates to an improvement in that class of water-closets in which the bowl is emptied, flushed, and after-filled from a tank located above it, its object being to produce a compact, reliable, noiseless, and effective device in which the tank is located low down or just above the level of the bowl and seat, instead of near the ceiling, as heretofore.

With these ends in view our invention consists in the combination, with a double-trapped siphon-bowl, of a tank located close to the same, exhaust and discharge mechanisms, including valves, located within the tank and respectively having independent connection with the closed air-space and flushing-rim of the bowl, and means located without the tank and connected with the mechanisms therein for operating them, whereby the air in the closed air-space of the bowl is exhausted into the tank by the said exhaust mechanism and the contents of the bowl expelled by the pressure of the atmosphere and the bowl flushed and after-filled by the said discharge mechanism.

Our invention further consists in certain details of construction and combinations of parts, as will be hereinafter described, and pointed out in the claims.

The tank A, which is of ordinary construction and provided with any of the devices ordinarily employed for filling it, (none are shown,) is located just above and to the rear of the bowl G and the seat G' thereof. It is furnished with a normally-empty chamber B set into its center and extending to the level of its upper edge. The function of this chamber being to exhaust the air from the closed air-space $h'$ between the two traps $g$ and $h$ of the bowl, it will hereinafter be called the "exhaust-chamber." The said chamber is cylindrical in form and closed at its upper end by a flexible diaphragm C, of rubber or other suitable material, the edges of the said diaphragm being clamped between two rings $a$ $a$, secured together by bolts $a'$. An upright valve-stem D, located in the center of the said chamber, is provided at its lower end with a vertically-movable crown-shaped outlet-valve D', opening out of the tank and closing over a ring-shaped seat $D^2$, secured to the bottom thereof, the valve being guided in its vertical movements by means of a pin E, extending below it and playing up and down in a bearing E', forming a part of the seat $D^2$. The said valve-seat is set into an opening F, formed in the bottom of the tank, and leads into a discharge-pipe F', the opposite end of which opens into the closed air-space $h'$ of the bowl G. The upper end of the valve-stem D projects through the center of the diaphragm C, which yields to permit the outlet-valve D' to be raised and lowered, the stem being secured to the diaphragm by an air-tight joint C', formed in any suitable manner. The extreme upper end of the stem is constructed with an eye $D^2$ for the attachment of a chain H, which is secured to a pulley H', mounted on a horizontal shaft I, the opposite ends of which are journaled in upright posts J J, fastened to the upper edges of the tank. The said exhaust-chamber B is also provided near its lower end with an inlet-valve K, pivoted to its outer face at the point K', and provided at its lower edge with a weight $K^2$. This valve rests upon a valve-seat L, consisting of a circular pipe joining the chamber at a sharp angle. An operating-finger $K^3$, fastened to the inner face of the valve, projects through the pipe L into the lower end of the chamber B in position to be engaged by the projecting edge of the crown-shaped outlet-valve D' when the same is allowed to move down upon its seat D². A small passageway M leads from the lower end of the chamber B at a point on the opposite side thereof from the inlet-valve K into the lower end of a small float-chamber N, containing a float N', which is attached to the lower end of a rod N², connected at its upper end with the short arm of a lever O, located in a substantially-horizontal position within a small flat chamber P, located upon the top of the tank, the opposite end of the said lever being adapted to move a free ball-shaped air-valve Q, co-operating with a suitable seat Q', formed in the top of the chamber P. The air-valve itself is inclosed and protected by a small box R, fixed to the top of the chamber P, which is connected with the float-chamber N by means of a vertical pipe S, which incloses the rod N² throughout the main portion of its length. An air-pipe S' leads from the upper end of the pipe S into the upper end of the exhaust-chamber B. The said exhaust-chamber and its adjuncts form an exhaust mechanism the primary function whereof is to so rarefy the air in the air-space closed in between the two traps of the bowl as to cause the pressure of the atmosphere upon the contents of the bowl to discharge them, the float and air-valve providing for the escape of air from the exhaust-chamber to permit the same to fill with water and for excluding air from the chamber at the time the water is discharged therefrom, so as to cause a portion of the air in the closed air-space of the bowl to rise to take its place, and thus so rarify the air in such space as to cause the atmosphere to act as described. The tank also contains a siphon consisting of a vertical chamber T, resting upon the bottom of the tank, extending up to the level of the top thereof and forming its long leg, and of a pipe T', extending very nearly to the bottom of the tank, opening into the upper end of the chamber T, and forming its short leg. The upper end of the chamber T is closed by a diaphragm T², having its edges clamped between rings $a\ a$ by means of bolts $a'\ a'$ in the same manner as described for the diaphragm C of the exhaust-chamber B. The vertically-movable crown-shaped outlet-valve U, located in the lower end of the chamber T and opening out of the tank, is carried by a hollow pipe U', forming the valve-stem and extending through the said valve, which is thereto constructed with a central opening, provision being thus made for the expulsion of the air in the siphon when the same is filling and for the escape of an excess of water in the tank in case of an overflow. The upper end of the pipe U' is left open and furnished with a stirrup U², connecting it with the hooked inner end of a short rod V, mounted in the center of the diaphragm T², with which it is connected by an air-tight joint V' of any suitable construction. The upper end of this rod V is provided with an eye V² for the attachment of a chain W, which passes over and is secured to a pulley W', also mounted on the horizontal shaft I, before mentioned. The said shaft is also furnished with a pulley I', having a chain I² passing over and secured to it, the lower end of the said chain being connected to the inner end of a horizontal lever X, fulcrumed upon a bracket X', located close to the bowl G, as seen in Fig. 3 of the drawings. The forward end of the said lever is furnished with a small anti-friction roller X² and bent upward in position to be engaged by the closet-seat G' when the same is depressed. A weight X³, depending from the inner end of the lever X, operates through the said lever to sustain the seat in its normal position of slight elevation above the bowl and through the chain I² to turn the shaft I so as to normally sustain the crown-shaped outlet-valves D' and U in the lifted positions in which they are shown in Fig. 1 of the drawings. The said outlet-valve U is provided at its lower end with a perforated pipe Y, extending at its lower end into the valve-seat Y', in which it plays up and down for guiding the said valve. The valve-seat Y' opens at its lower end into a flushing-pipe Z, the opposite end whereof is connected with the flushing-rim G² of the bowl. The lower end of the chamber T has an inlet-valve $b$ pivoted upon its outer face at the point $c$. The said valve is furnished at its lower end with a weight $d$ and rests upon an inclined valve-seat $e$, connected at an angle with the lower end of the chamber T, and is provided with an inwardly-projecting operating-arm $f$, extending into the lower end of the chamber T in position to be engaged by the overhanging edge of the valve U when the same is lowered upon its seat. The said valve $b$, its weight $d$, operating-finger $f$, and seat $e$ all correspond to parts before described for the exhaust-chamber B. The said siphon and its adjuncts form discharge mechanism for emptying the main body of water in the tank through the bowl.

The bowl G is an ordinary bowl constructed with two traps $g$ and $h$, a flushing-rim G², and a vent $i$, the latter having connection with a chimney or other suitable flue. The traps $g$ and $h$ co-operate, as before mentioned, to form a closed air-space $h'$. Strictly speaking the said space is not always closed, as it has communication with the outer air through the exhaust-chamber when the same is empty, as it normally is; but when the said chamber is being discharged the said space has no communication with the outer air and is practically closed, and we have chosen to refer to it from the standpoint of its practical operation.

Having now described our improvement in detail, we will set forth its mode of operation. When the closet is not in use, the weight X³ will sustain the outlet-valves D' and U in the elevated positions in which they are shown in Fig. 1 of the drawings and the seat G' in the elevated position in which it is shown in Fig. 3 thereof. The inlet-valves K and b, respectively leading into the exhaust-chamber B and the siphon T, are at this time closed, as also shown by Fig. 1. The exhaust-chamber and the siphon are therefore normally empty. When, however, the seat G' is depressed, it operates the horizontal lever X in lifting the weight $X^3$, whereby the outlet-valves D' and U are permitted to descend upon their seats, thus closing the outlets from the said chambers into the pipes F' and Z. As the said outlet-valves D' and U descend, their edges engage with the operating-fingers $K^3$ and $f$ and open the inlet-valves K and b. Water will now flow through the valve K into the exhaust-chamber B, and from thence into the float-chamber N, the air displaced by the incoming water being expelled through the valve-seat Q', which is at first unobstructed by the air-valve Q; but as the water rises in the chamber N the float N' will be lifted and the horizontal lever O reversed in position, whereby the air-valve Q will be allowed to fall upon its seat. It is very easily lifted, however, and does lift for the expulsion of the air in the chamber B, the chamber N, and the pipe S as long as water continues to flow into them, which will ordinarily be until the level of the water in them is the same as the level of the water in the tank. At the same time that the inlet-valve K is opened the inlet-valve b will also be opened, permitting water to flow into the chamber T of the siphon, the air displaced flowing down through the hollow stem U' of the valve U, and thence through the pipe Z to the flushing-rim $G^2$ of the bowl. Should there be an overflow of water from any cause, it will be taken off by this hollow stem of the valve U. When the seat G' of the closet is relieved of pressure, the weight $X^3$ will at once operate to lift both of the outlet-valves D' and U, the inlet-valves K' and b being at the same time closed by suction and gravity upon the disengagement of the said outlet-valves from their inwardly-projecting arms $K^3$ and $e$. The water in the exhaust-chamber B will now be discharged through the pipe F' not into the main basin which is included in the trap $g$ of the bowl, but into the space $h$ and the trap $g$ thereof, forming a partial vacuum in the upper end of the exhaust-chamber B, the air-valve Q being at this time closed. A portion of the air located in the space $h'$ of the bowl between the traps $g$ and $h$ thereof will therefore be exhausted into the upper end of the said chamber and the air in the said space $h'$ so rarefied that the pressure of the atmosphere upon the surface of the water in the trap $g$ of the bowl will at once operate to expel the contents thereof. At the same time that the water is being discharged from the exhaust-chamber B it will also be discharged from the float-chamber N, permitting the float N' to fall, and thus lift the ball-valve Q and permit a free inflow of air into the exhaust-chamber D, the exhaust action thereof being thus arrested just about the time that it is emptied. At the same time that the valve D' is raised the valve U is raised, whereby the water in the chamber T' is discharged through the pipe X into the flushing-rim $G^2$ of the bowl. The rarefication of the air in the upper end of the chamber T at once starts the siphon, the pressure of the atmosphere upon the surface of the water in the tank causing it to flow through the short leg of the siphon over into the chamber T, through which it continues to discharge until it is broken by being lowered below the lower end of the leg T'. This concludes one operation of the closet, which is left with its outlet-valves D' and U raised above their seats and the inlet-valves K and b closed, so that the tank may be again refilled and the operation before set forth repeated. It will thus be seen that the contents of the bowl are expelled by the mediation of the exhaust-chamber and the various instrumetalities connected therewith, while the bowl is flushed and after-filled by the siphon, which forms an independent water-discharge mechanism.

In Fig. 6 of the drawings we have shown a modified construction of the exhaust-chamber B, in which the diaphragm C is replaced by an inverted cup $i$, playing up and down in an annular cup $i'$, surrounding the upper end of the chamber and filled with mercury or water. This construction may be also used in connection with the siphon, if desired.

In the construction herein shown and described the outlet-valves are connected directly with the seat through their stems, while the inlet-valves are connected with the seat indirectly through the outlet-valves. If desired, the inlet-valves may also be directly connected with the seat—as, for instance, by chains passed over pulleys upon the shaft in opposite directions from the chains of the outlet-valves. Nor is it essential that we operate the exhaust and discharge mechanism of the tank by the seat, although the same affords a simple and convenient way of doing the work required.

The simplified tank $j$ (shown by Fig. 7 of the drawings) contains my improved siphon in a form essentially like that in Fig. 1 and comprising legs $k$ and $k'$, the former being larger than the latter. The said legs are respectively provided with outlet-valves $l$ and inlet-valves $l'$, corresponding to the valves U and b, before described, with the exception that in this case the movement of the closet-seat is not indirectly communicated to the inlet-valve through the outlet-valve, but directly, as has been elsewhere suggested. As herein shown, the two valves are connected with the seat by means of chains $n$ and $n'$ passing in opposite directions over the same pulley $o$, which is mounted on a shaft $o'$, also carrying another pulley, (not shown,) to which is attached a chain leading to the seat, which is not shown in the figures of the drawings being described. When this form of tank is used, the water is discharged from it directly into the main receptacle of the bowl, the contents whereof are discharged by the force of water as it runs out of the tank rather than by atmospheric pressure. This tank should therefore be located at a sufficient distance above the bowl to secure force enough in the water being discharged from it to empty the same.

The operation of the siphon, as shown in Fig. 7, is the same as when it is associated with the exhaust-chamber, viz: It is normally empty, filled by the reversal of its valves when the seat is depressed and set running, and discharging the tank when the seat is allowed to return to its normal position, and hence the valves to theirs.

In the beginning of this description we spoke of the object of our invention as being the production of a closet having a low-down tank, and that is indeed its primary object; but we wish to include, also, the use of our improved siphon in a tank placed above the bowl. We would therefore have it understood that we do not limit ourselves to the exact construction herein shown and described, but hold ourselves at liberty to make such changes and alterations as fairly fall within the spirit and scope of our invention.

We are aware that a water-closet tank having two compartments and an inlet-valve and an outlet-valve constructed and arranged to control the filling and discharge of one of the said compartments and to coact so that as one closes the other opens, and vice versa, is old, and we do not claim that construction, broadly.

Having fully described our invention, what we claim as new, and desire to secure by Letters Patent, is—

1. In a water-closet, the combination, with a double-trapped siphon-bowl, of a tank located close to the same, a normally-empty exhaust-chamber located in the said tank, connection between the said chamber and the closed air-space of the bowl, a normally-open outlet-valve between the said chamber and the said connection, and a normally-closed inlet-valve between the tank and the chamber, the said valves being operated reversely, means for arresting the exhaust action of the said chamber, and independent water-discharge mechanism located in the tank and connected with the flushing-rim of the bowl, substantially as described, and whereby the contents of the bowl are expelled by the action of the said chamber and the bowl flushed and refilled by the action of the said independent water-discharge mechanism.

2. In a water-closet, the combination, with a double-trapped siphon-bowl, of a tank located close to the bowl, a normally-empty exhaust-chamber, and a normally-empty siphon located in the tank, normally-open outlet-valves respectively leading from the said chamber and siphon to the closed air-space and flushing-rim of the bowl, normally-closed inlet-valves leading from the tank to the said chamber and the long leg of the siphon, a float and an air-valve co-operating with the said exhaust-chamber, and means for operating the said outlet and inlet valves, substantially as described, and whereby the outlet-valves are closed and the inlet-valves opened for filling the said chamber and siphon and then reversed to discharge them.

3. In a water-closet, the combination, with a double-trapped siphon-bowl, of a tank located close to the bowl, a normally-empty exhaust-chamber and a normally-empty siphon located in the tank, a float and an air-valve co-operating with the exhaust-chamber, normally-open outlet-valves located within the said chamber and siphon and leading therefrom to the closed air-space and flushing-rim of the bowl, normally-closed inlet-valves leading from the tank into the said chamber and the long leg of the siphon and constructed and arranged to be automatically opened by the outlet-valves when the same are closed, and means for operating the said outlet and inlet valves, substantially as described, whereby the outlet-valves are closed and the inlet-valves opened for filling the said chamber and siphon from the tank and then reversed to discharge them.

4. In a water-closet, the combination, with a double-trapped siphon-bowl, of a seat normally supported just above the same, a tank located close to the bowl and seat, a normally-empty exhaust-chamber and a normally-empty siphon located in the tank, a float-chamber communicating with the upper and lower ends of the exhaust-chamber, a float located in the float-chamber, an air-valve controlling the outlet and inlet of air from and into the float-chamber and hence the exhaust-chamber, connection between the float and air-valve, normally-open outlet-valves located within the said exhaust-chamber and siphon and respectively leading therefrom to the closed air-space and flushing-rim of the bowl, normally-closed inlet-valves leading from the tank into the lower ends of the exhaust-chamber and the long leg of the siphon, and connections between the said outlet and inlet valves and the seat, substantially as described, and whereby the outlet-valves are closed and the inlet-valves opened when the seat is depressed and reversed when it is allowed to return to its normal position, substantially as described.

5. In a water-closet, the combination, with a double-trapped siphon-bowl, of a tank located close to the bowl, a normally-empty exhaust-chamber and a normally-empty siphon located in the tank, a float and an air-valve co-operating with the exhaust-chamber, normally-closed inlet-valves leading from the tank into the lower ends of the exhaust-chamber and the long leg of the siphon, normally-open outlet-valves located in the lower end of the exhaust-chamber and in the lower end of the long leg of the siphon and respectively leading to the closed air-space and the flushing-rim of the bowl, valve-stems connected with the outlet-valves and leading up out of the said exhaust-chamber and siphon, which are thereto provided with movable air-tight tops, and operating connections attached to the projecting upper ends of the said stems, substantially as described, and whereby the outlet-valves are closed and the inlet-valves opened for filling the chamber and siphon from the tank and then reversed for discharging them.

6. In a water-closet, the combination, with a double-trapped siphon-bowl, of a seat normally supported just above the same, a tank located close to the bowl and seat, a normally-empty exhaust-chamber and a normally-empty siphon located in the tank, normally-open outlet-valves respectively leading from the said chamber and siphon to the closed air-space and flushing-rim of the bowl, normally-closed inlet-valves leading from the tank to the said chamber and siphon, a float and an air-valve co-operating with the said exhaust-chamber, and connections between the seat and outlet and inlet valves, substantially as described, and whereby the outlet-valves are closed and the inlet-valves opened when the seat is depressed and reversed when it is allowed to return to its normal position.

7. In a water-closet, the combination, with a bowl, of a tank, a normally-empty chamber located in the tank, connection between the said chamber and the bowl, a normally-open outlet-valve located between the said chamber and connection, a normally-closed inlet-valve between the said chamber and the tank, one of the said valves having an arm which co-operates with the other valve in opening it, means for operating the outlet-valve from without the tank, a float-chamber connected with the upper and lower ends of the said chamber, a float located in the said float-chamber, and an air-valve connected with the said float and controlling the egress of air from and into the said float-chamber, substantially as set forth.

8. In a water-closet tank, the combination, with a siphon located therein, of an outlet-valve located within the long leg of said siphon and leading therefrom, an inlet-valve leading from the tank into the said leg of the siphon, a hollow stem for the outlet-valve which has an open passage through it, and means for raising and lowering the said stem, substantially as described, the said hollow stem forming an outlet for air and an overflow-outlet for water.

9. In a water-closet, the combination, with a bowl, of a seat normally supported above the same, a tank, a normally-empty siphon located in the tank, a normally-open outlet-valve leading out of the tank to the bowl, a normally-closed inlet-valve leading into the siphon from the tank, an air-escape for the siphon, and connection between the said valves and the seat, substantially as described, and whereby the valves are reversed in position when the seat is depressed and returned to their normal positions again when it is allowed to resume its normal position, substantially as described.

In testimony whereof we have signed this specification in the presence of two subscribing witnesses.

ROBERT MORGAN.
    JOHN MENZIES.

Witnesses:
 FRED. C. EARLE,
 LILLIAN D. KELSEY.